United States Patent
Smith et al.

(10) Patent No.: US 10,923,237 B2
(45) Date of Patent: Feb. 16, 2021

(54) DEBRIS FILTERS FOR NUCLEAR FUEL ASSEMBLY AND METHOD OF USING THE SAME

(71) Applicant: Global Nuclear Fuel—Americas, LLC, Wilmington, NC (US)

(72) Inventors: Brandon P. Smith, Wilmington, NC (US); Carlton W. Clark, Wilmington, NC (US); Richard C. Longren, Wilmington, NC (US); Gerald M. Latter, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 425 days.

(21) Appl. No.: 15/687,712

(22) Filed: Aug. 28, 2017

(65) Prior Publication Data
US 2019/0066854 A1    Feb. 28, 2019

(51) Int. Cl.
*G21C 3/32*      (2006.01)
*G21C 19/307*   (2006.01)
(Continued)

(52) U.S. Cl.
CPC ......... *G21C 3/3206* (2013.01); *G21C 19/307* (2013.01); *B01D 39/10* (2013.01);
(Continued)

(58) Field of Classification Search
CPC .. G21C 3/3305; G21C 3/3206; G21C 19/307; B01D 39/10; B01D 39/12; B01D 46/247; B01D 2046/2481
See application file for complete search history.

(56) References Cited

U.S. PATENT DOCUMENTS 1,240,081 A * 9/1917 Moss ................ B01D 21/0039
                                                          210/521
4,652,425 A * 3/1987 Ferrari ................ G21C 3/3206
                                                          376/352
(Continued)

FOREIGN PATENT DOCUMENTS

JP    2001141866 A  *  5/2001
JP    2005172748 A  *  6/2005  ........... G21C 3/3206
(Continued)

OTHER PUBLICATIONS

EPO, European Search Report in corresponding EPO application 18190955.7, dated Jan. 1, 2019.

*Primary Examiner* — Lily C Garner
(74) *Attorney, Agent, or Firm* — Ryan Alley IP

(57) ABSTRACT

Debris filters fit in fuel assembly lower tie plates and filter fluids passing therethrough. Filters use a series of adjacent plates with aligned peaks and valleys to create several channels. The plates have small excisions in diamond, triangle, or other debris-catching shapes, such as near a lower portion of the filter where fluid enters the filter. Excisions may alternate around each channel, such as four alternating cut-outs in 90-degree intervals about a channel circumference. Excisions may be sized to entrap smaller debris common in reactor coolant flow and liable for fretting damage to fuel cladding. Multiple vertical stages can be used in filters, with different channels for each stage. Ligaments may hold each stage to the next, potentially with a gap between stages for intermixing. Plates, peaks, valleys, ligaments, and excisions may all be formed in a single stamping operation to eliminate excess or overlapping pieces or extensions.

9 Claims, 5 Drawing Sheets

(51) Int. Cl.
*B01D 46/24* (2006.01)
*G21C 3/33* (2006.01)
*B01D 39/10* (2006.01)
*B01D 39/12* (2006.01)

(52) U.S. Cl.
CPC ............ *B01D 39/12* (2013.01); *B01D 46/247* (2013.01); *B01D 2046/2481* (2013.01); *G21C 3/3305* (2013.01)

(56) References Cited

U.S. PATENT DOCUMENTS

| | | | | |
|---|---|---|---|---|
| 4,678,627 A * | 7/1987 | Rylatt | ................ | G21C 3/32 376/313 |
| 4,828,791 A * | 5/1989 | DeMario | .............. | G21C 3/3206 376/352 |
| 5,037,605 A * | 8/1991 | Riordan, III | ............. | G21C 3/32 376/352 |
| 5,100,611 A * | 3/1992 | Nylund | ................... | G21C 3/32 376/352 |
| 5,483,564 A * | 1/1996 | Matzner | ............... | G21C 3/3206 376/352 |
| 5,488,634 A * | 1/1996 | Johansson | ........... | G21C 3/3206 376/313 |
| 6,385,271 B2 * | 5/2002 | Nylund | ................. | G21C 3/336 376/439 |
| 6,847,695 B2 * | 1/2005 | Kageyama | ........... | G21C 3/3206 376/310 |
| 7,149,272 B2 * | 12/2006 | Soderlund | ............. | G21C 3/322 376/310 |
| 7,337,549 B2 * | 3/2008 | Cho | ....................... | G01C 17/38 33/316 |
| 7,577,230 B2 * | 8/2009 | Aktas | .................... | G21C 3/322 376/453 |
| 7,822,165 B2 * | 10/2010 | Broach | ................ | G21C 3/3206 376/362 |
| 8,317,035 B2 * | 11/2012 | Elkins | .................. | G21C 3/3206 210/521 |
| 8,611,488 B2 * | 12/2013 | Diller | ....................... | G21C 3/30 376/313 |
| 8,824,620 B2 * | 9/2014 | Knabe | ................. | G21C 3/3206 376/313 |
| 8,824,621 B2 * | 9/2014 | Huq | ..................... | G21C 3/3206 376/308 |
| 9,202,598 B2 * | 12/2015 | Russell, II | ............... | G21C 3/14 |
| 9,583,222 B2 * | 2/2017 | Friedrich | ................ | G21C 3/32 |
| 9,620,249 B2 * | 4/2017 | Elkins | ................... | G21C 3/3206 |
| 10,418,135 B2 * | 9/2019 | Yu | ......................... | G21C 3/3206 |
| 10,717,032 B2 * | 7/2020 | Greenwood | ........... | B21D 31/04 |
| 2004/0135270 A1 * | 7/2004 | Lantz | ....................... | B01J 19/32 261/94 |
| 2006/0283790 A1 * | 12/2006 | Elkins | .................. | G21C 3/3206 210/335 |
| 2009/0060114 A1 * | 3/2009 | DeFilippis | ........... | G21C 3/3206 376/313 |
| 2009/0184504 A1 * | 7/2009 | Greenwood | ........... | B01D 46/24 280/741 |
| 2010/0310034 A1 * | 12/2010 | Jiang | ...................... | G21C 3/322 376/442 |
| 2011/0268240 A1 * | 11/2011 | Huq | .......................... | G21C 3/3206 376/313 |
| 2013/0272480 A1 * | 10/2013 | Ullmann | ............... | G21C 3/3305 376/440 |
| 2013/0279642 A1 * | 10/2013 | Yu | .......................... | B01D 29/03 376/352 |
| 2014/0056397 A1 * | 2/2014 | Friedrich | ............... | G21C 3/322 376/313 |

FOREIGN PATENT DOCUMENTS

| | | | |
|---|---|---|---|
| JP | 2012-117921 | 6/2012 | |
| JP | 2012117921 A * | 6/2012 | |
| WO | WO-2015089835 A1 * | 6/2015 | .......... G21C 3/3206 |

\* cited by examiner

DEBRIS FILTERS FOR NUCLEAR FUEL ASSEMBLY AND METHOD OF USING THE SAME

BACKGROUND

FIG. 1 is a perspective view of a related art nuclear fuel lower tie plate 10. As seen in FIG. 1, lower tie plate 10 may include several apertures 17 to receive nuclear fuel rods at a lower axial terminus of the rods, to support and secure the same at the bottom of a fuel assembly. Lower tie plate 10 includes a lower nozzle with fluid inlet 11 into which reactor coolant 41 can flow during operation. The lower nozzle and fluid inlet 11 may be shaped to fit into a fuel support structure, which supports all fuel assemblies in a nuclear core. Lower tie plate 10 is typically hollow, or at least includes an internal flow path, such that fluid coolant 41 can flow up through lower tie plate 10 and out flow holes 15 and up through the fuel bundle, in the space between fuel rods. Debris filter 2 may be installed in such an internal flow path, such as in a console position with a sealing plate 18 holding filter 2 in lower tie plate 10 when installed.

FIG. 2 is a cross-sectional side schematic of lower tie plate 10 as installed in a fuel assembly with multiple fuel rods 14 seated into apertures 17 of tie plate 10. An exterior channel 12 may surround all fuel rods 14 to direct fluid flow up through the fuel bundle between fuel rods 14. One or more spacers 19 may position and align fuel rods 14 at various axial positions. Fuel rods 14 may include lower end plugs 16 that seat into lower tie plate 10 and positions rods 14 axially and transversely with lower tie plate 10. Additional apertures or flow outlets 15 may allow fluid coolant to flow up through the fuel bundle between fuel rods 14 after exiting lower tie plate 10.

As seen in FIG. 2, fluid coolant 41 flows into lower tie plate 10 through lower fluid inlet 11 and becomes an internal flow 42 that passes through filter 2 installed in the same. As such, coolant flow 42 may be filtered prior to reaching fuel rods 14. Debris in flow 42 may be blocked by filter 2 and may be retained in the same, such that the debris does not pass up into fuel rods 14 or spacers 19, where it may potentially damage fuel rods 14. Filter 2 is typically a uniform, solid metal filter with completely closed flow channels to filter the fluid coolant and debris therein. As fluid coolant 41 is driven up through lower tie plate 10 in a nuclear fuel assembly, such as by reactor circulation pumps, the limited size of closed channels of filter 2 may block debris from flowing with the coolant and into the bundle.

SUMMARY

Example embodiments include debris filters useable in nuclear reactors, such as in fuel assembly lower tie plates, to filter fluids passing through the same. Example filters may include several plates with local minima and maxima that are aligned from plate to plate and may join the plates together. Flow paths, or channels, may thus be defined between two plates, and a plurality of such flow paths can be formed across the filter using two or more plates. The plates may be irregular, having small subtractions like divots or holes that extend vertically in the plates along the channels to catch debris as it enters with fluid coolant into the channels. The missing areas may be mostly at a lower edge or lower portion of the filter where fluid first reaches the filter. Where plates approach or touch to define channels, the plates may be solid, such that a single cut-out feature is on a wall of the channel between local minima and maxima. In this way, each channel in an example embodiment filter may have multiple, alternating cut-outs. Example embodiment plates may be formed by stamping, with no excess pieces or flares extending into the channel. Each plate may be continuously joined or even biased to a directly adjacent plate so as to form closed channels except at any cut-out features and entrance/exits. Multiple vertical stages can be used in example embodiment filters, with different channels for each stage. A series of ligaments stamped from the plates may hold each stage to the next, potentially with a gap between stages to permit intermixing.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
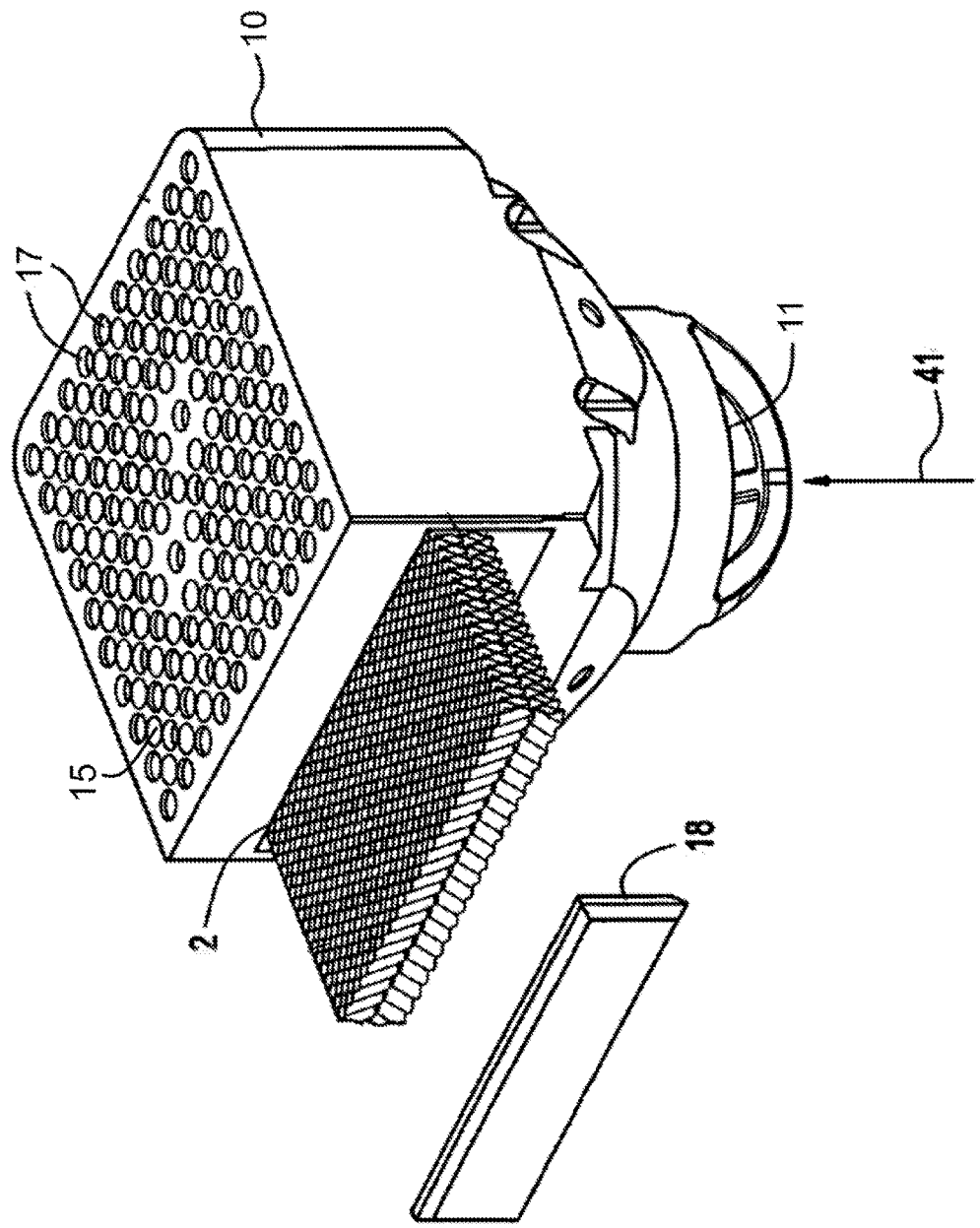
FIG. 1 is a perspective view of a related art nuclear fuel lower tie plate with filter.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that conventional nuclear fuel filters use large flow channels to block debris in a fluid coolant flowing therethrough, thereby retaining large debris pieces from the flow through geometric constraints and/or the change of momentum into the channels. The inventors have found that such large channels, while effective against larger pieces of debris, do not filter smaller shreds and scraps of metal and other rigid materials of millimeter- or smaller scale. These smaller pieces are the most likely to become caught against a fuel rod and fret the same. To overcome these newly-recognized problems as well as others, the inventors have developed example embodiments and methods described below to address these and other problems recognized by the inventors with unique solutions enabled by example embodiments.

The present invention is debris filters and nuclear fuel assemblies and methods of using the same. In contrast to the present invention, the few example embodiments and example methods discussed below illustrate just a subset of the variety of different configurations that can be used as and/or in connection with the present invention.

Figure 2:
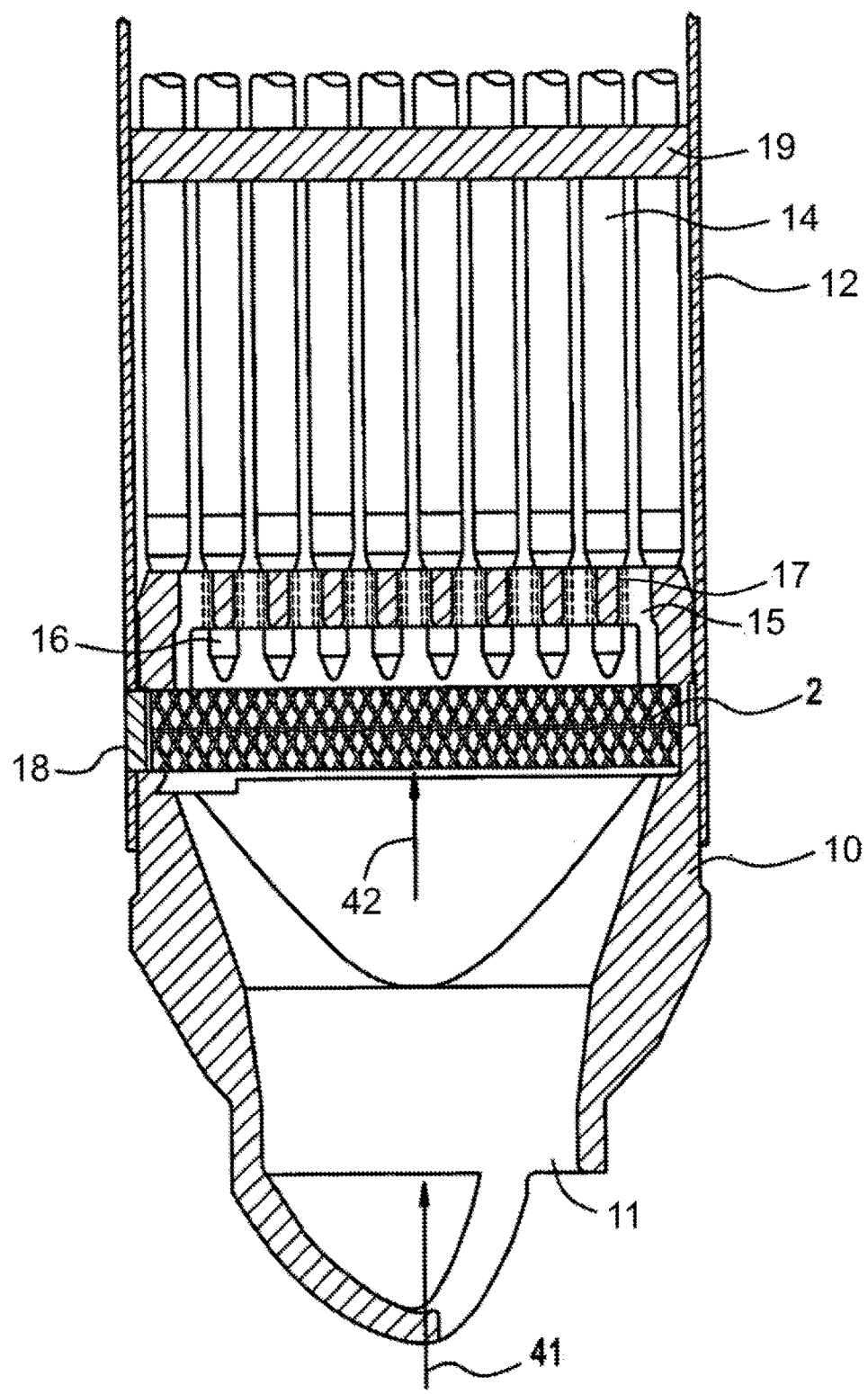
FIG. 2 is a cross-section of the related art nuclear fuel lower tie plate with filter.
Figure 3:
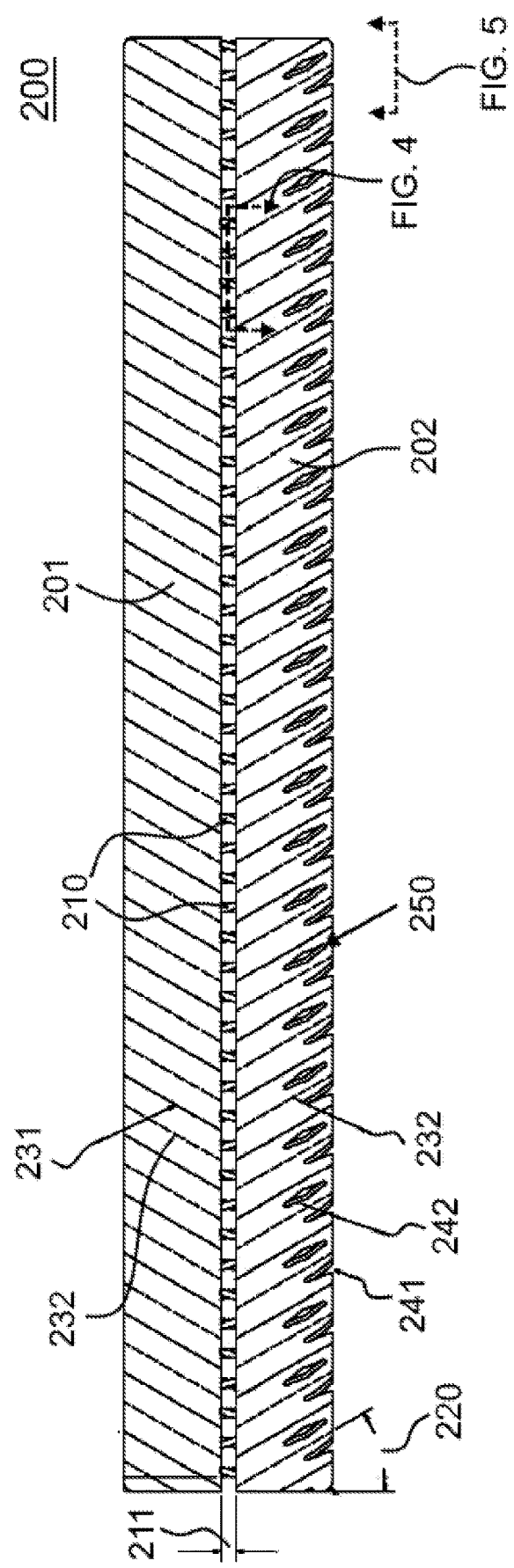
FIG. 3 is a side view of an example embodiment debris filter useable in a nuclear fuel assembly.

FIG. 3 is a side view of an example embodiment debris filter 200 useable in nuclear fuel assemblies, such as in lower tie plate 10 (FIGS. 1 & 2), as a replacement for or in combination with filter 2. As shown in FIG. 3, example embodiment debris filter 200 includes an upper section 201 and a lower section 202 joined by ligaments 210 in a gap section 211. Upper section 210 may include a plurality of plates each with a waveform, step-wise or corrugated cross section that form an alternating series of peaks 231 and valleys 232. The plates in upper section 201 may be arranged adjacent to one another such that valley 232 of one plate directly contacts a peak 231 of the next plate in a transverse direction (into the page of FIG. 3), forming a plurality of channels 250. For example, upper section 201 may have a configuration similar to the debris filters of co-owned US Patent Publication 2006/0283790 to Elkins et al., for DEBRIS FILTER and incorporated by reference herein in its entirety. As a further example, upper section 201 may be the same as second filter 204 in the incorporated '790 publication.

Lower section 202 may also be formed of several adjacent plates that form open or closed fluid channels 250. The plates may have peaks 231 and valleys 232, and channels 250 formed therebetween, extending at one angle, which may be different from an angle of the channels of upper section 201. For example, angle 220 of peaks 231 and valleys 232 in lower section 202 may be mirrored about an axial line between upper section 201 and lower section 202. Or angle 220 may be continued between sections such that channels 250 are parallel and/or continuous between sections. Channels 250 in one section may align with another in a one-to-one basis, or one channel may open into multiple channels in another section. Lower section 202 and upper section 201 may be directly joined, or, as shown in FIG. 3, lower section 202 and upper section 201 may be separated. For example, a gap section 211 may provide open flow space between sections 201 and 202. The cut line in FIG. 3 illustrates the perspective of FIG. 4, illustrating an example structure to create gap section 211.

Figure 4:
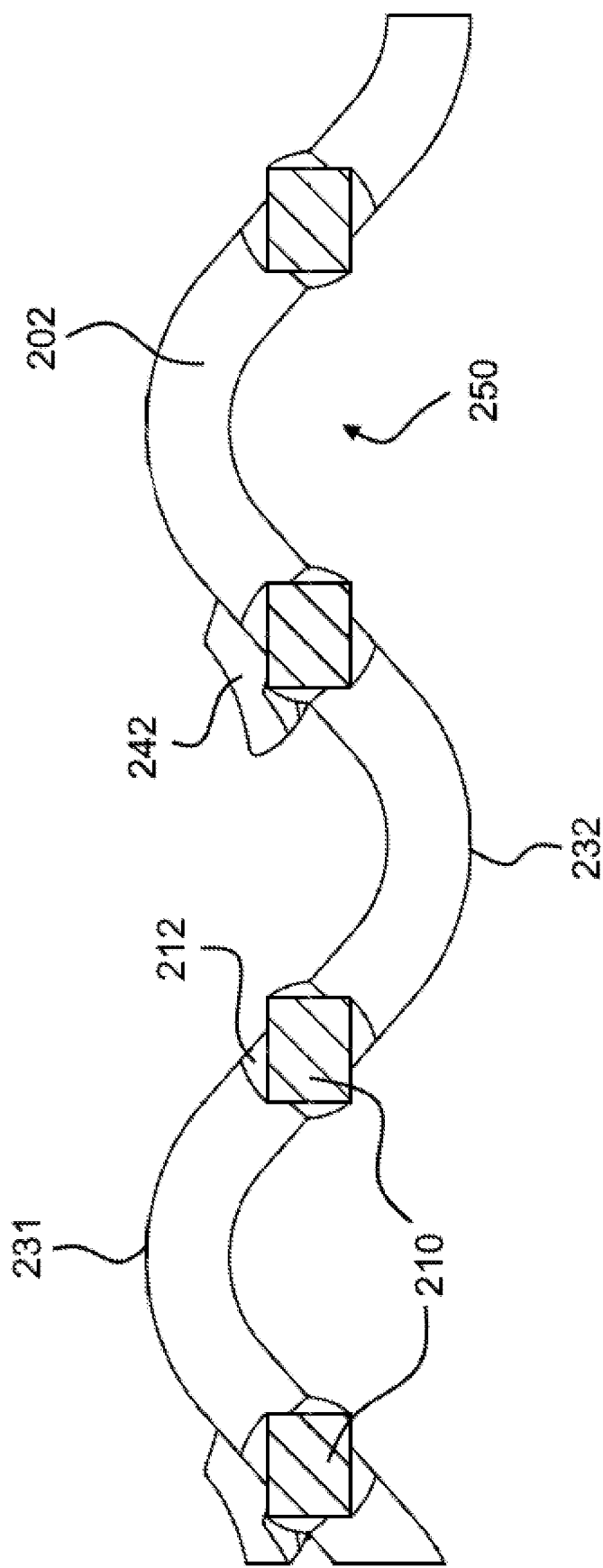
FIG. 4 is a cross-section of an example embodiment debris filter.

FIG. 4 is a cross-sectional view from an end perspective of a single plate of lower section 202. As seen in FIG. 4, one or more ligaments 210 may be formed at a terminal edge of any plate forming lower section 202 and/or terminal edges of plates of upper section 201 (FIG. 3). For example, ligaments may be continuous with lower section 202 and upper section 201 (FIG. 3), formed by stamping and shaping the plates of adjacent sections while preserving ligaments 210 between the two. Ligaments 210 may be formed at an inflection point between peaks 231 and valleys 232, for example, at each inflection point between each peak 231 and valley 232 of lower section 202 and upper section 201 (FIG. 3). In this way, ligaments 210 may align channels 250 in both one-to-one relationships between sections and staggered relationships, such that one channel of lower section 202 might open into plural channels of upper section 201 (FIG. 3).

Ligaments 210 may have a twist 212 in their profile, turning as they extend axially. Such a twist 212 may impart a swirl or some turbulence in flow between sections 201 and 202 in gap 211, allowing debris to leave flow between filter sections. If differing angles are used between filter sections in gap section 211, the momentum change between flow in lower section 202 and upper section 201 may further encourage debris to exit between filters in gap section 211 in combination with the slight flow disturbance caused by twist 212. Ligaments 210 may otherwise be small and not protrude further into channels 250, such that ligaments 210 may not block and/or cause pressure drop in flow channels 250 through example embodiment filters while still securely joining sections 201 and 202.

Lower section 202 may be similar to upper section 201 with peaks 231 and valleys 232 forming channels 250 between adjacent plates. However, as shown in FIG. 3, lower section 202 may include a plurality of cut-out features at edge and lower portions of lower section 202. For example, lower section 202 may include a plurality of notches 241 at lower edges in channels 250 and/or windows 242 in the plates to form openings in channels 250. As shown in FIG. 3, one notch 241 may be at a bottom-most terminal edge of lower section 202 on one side of a peak 231, for example, and one window may be centered in a bottom half of lower section 202 on the other side of peak 231. In this way, windows 242 and notches 241 may be present in each channel 250 in alternate fashion on either side of, and away from, peaks 231 and valleys 232. Windows 242 and notches 241 may be formed continuously across the entire bottom edge of lower section 202 on each plate, creating two notches 241 and two windows 242 in each channel 250. Although notches 241 and windows 242 are shown in lower portions and on lowest edges of lower section 202, it is understood that they may be placed elsewhere, including middle and upper portions of section 202 as well as a highest edge of section 202.

Figure 5:
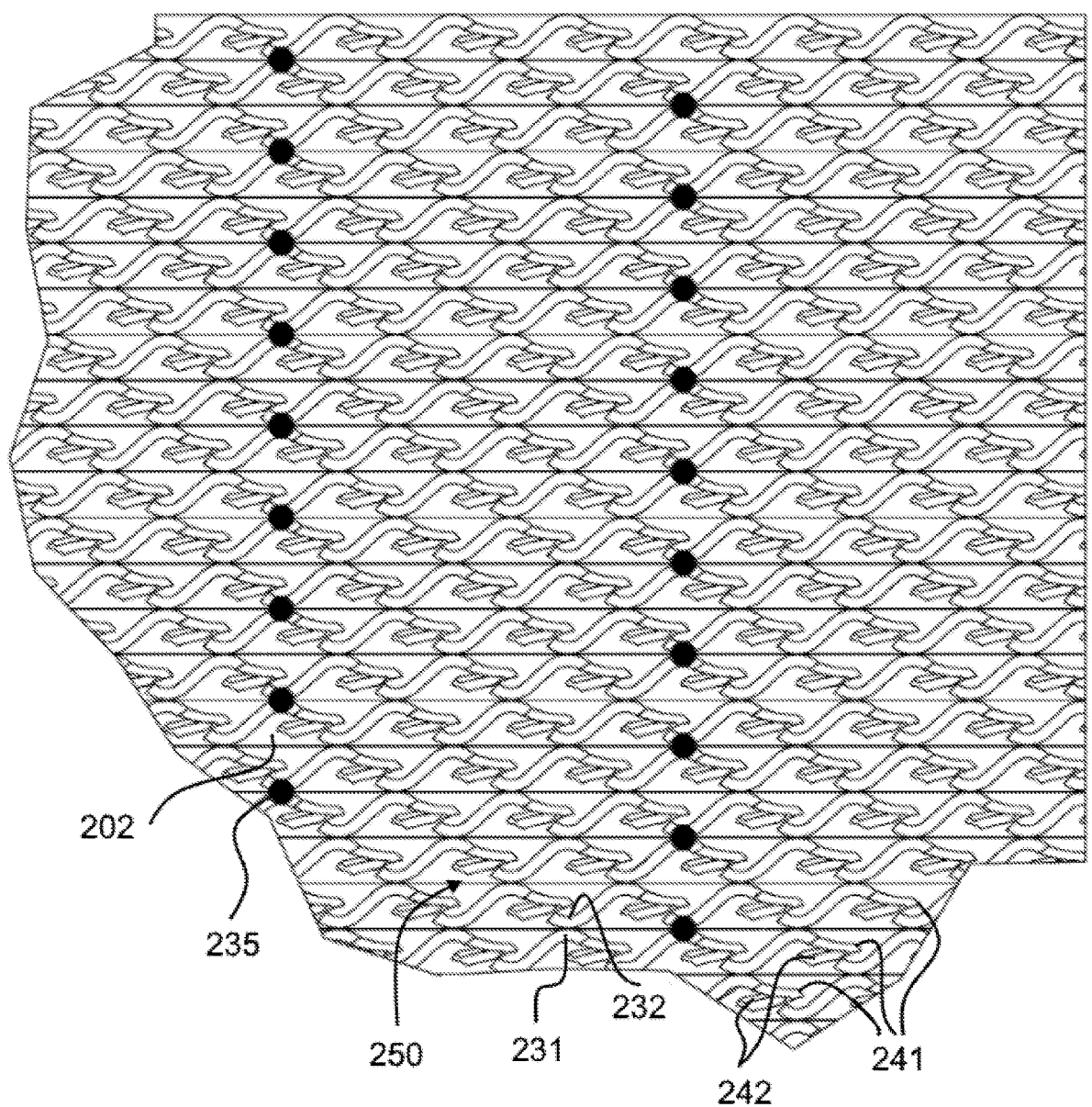
FIG. 5 is a bottom view of a section of an example embodiment debris filter.

The view line in FIG. 3 illustrates a bottom perspective for FIG. 5 as viewed looking axially upward orthogonal to a lower face of lower section 202. As seen in FIG. 5, a plurality of channels 250 are formed between adjacent peaks 231 and valleys 232 and proceed vertically (into the page) at an angle, such as angle 220 (FIG. 3). A plurality of notches 241 are presented at the lower-most position or entry position of channels 250. Windows 242 are seen further into channels 250, providing openings between channels 250. Notches 241 and windows 242 may be sized to closely match expected debris sizes, such as diamond-like shapes of less than 1 cm in a longest dimension, to entrap debris that encounters the same. Windows 242 and notches 241 may not extend transversely into any channel 250 to limit effect on pressure drop or blockage.

Notches 241 and/or windows 242, if positioned at lower or entry areas of lower portion 202 for example, may effectively capture debris from a coolant fluid by geometric matching of such cut-out features with the debris and taking advantage of a momentum differential between the fluid forced into channels 250 and debris that may be denser and thus slower to redirect. At the entry to lower section 202, debris may be more likely to contact and be entrapped in lower notches 241 and/or windows 242 because of the flow disturbances they create and/or because the debris and flow have not yet had time to move consistently together in channels 250. Notches 241 and/or windows 242 may be formed by stamping or cutting out, for example, from individual plates forming lower section 202. Because notches 241 and/or windows 242 may be formed by subtraction during stamping, with no extension or flares into the flow path of channels 250, they may not produce an undue pressure drop or turbulence of coolant fluid, allowing for a robust, but filtered, coolant flow into and through a fuel assembly.

Adjacent peak 231 and valley 232 on directly adjacent plates touch at join points 235, which are shown as exaggerated in FIG. 5 to illustrate their presence. Spot welding, adhesives, brazing, dipping, etc. at join points 235 may be used to join adjacent plates. If a continuous joining is used, such as a continuous weld or dipped adhesive, or a biasing bolting or spot welding is used, join points 235 may close channels 250, not allowing fluid flow between different channels 250 (beyond any windows 242 that may be used). Alternatively, discreet join points 235 or usage at only some peaks and valleys may allow fluid to flow between channels 250 by small separations at peaks and valleys.

Although example embodiment debris filter 200 is shown with a single upper section 201 and single lower section 202 that differ from one another and are separated by a gap section 211, it is understood that these sections may be used in different combinations. For example, two identical lower sections 202 could be used with only angle 220 differing between them, and they could be directly joined with no gap section 211. Similarly, a single-stage filter with only a lower section 202 could be used. Still further, a multiple-stage filter with three or more upper sections 201 repeated with gap sections 211 and ligaments 210 between each stage could be used.

Example embodiment debris filter 200 may be fabricated of resilient materials that are compatible with a nuclear reactor environment without substantially changing in physical properties, such as becoming substantially radioactive, melting, embrittlement, and/or retaining/adsorbing radioactive particulates. For example, several known structural materials, including austenitic stainless steels 304 or 316, XM-19, zirconium alloys, nickel alloys, Alloy 600, etc. may be chosen for any element of components of example embodiment debris filters. Joining structures and directly-touching elements may be chosen of different and compatible materials to prevent fouling. Each plate spanning upper and lower sections, and even entire example embodiment debris filter 200, may be fabricated as a single part, such as through stamping, casting and/or molding, reducing complexity. Still further, example embodiment debris filters may be manufactured through additive manufacturing, by building up each component successively from a simplest, central component and welding additional, outer components to the same.

Example embodiment debris filter 200 may be installed in an existing lower tie plate 10 (FIG. 1), such as to replace a related debris filter 2 following operation, or in a new fuel assembly in the same manner. Following operation, example embodiment debris filter 200 may be removed from lower tie plate 10 through removal of sealing plate 18 and potentially replaced with a new filter 200. In this way, burnt fuel assemblies may use fresh filters 200 with each cycle, and old filters 200, potentially housing caught debris, can be safely disposed of, thus removing such debris from the reactor. Alternatively, example embodiment fuel filters may be non-modular and sealed within a fuel assembly or other reactor coolant flow space permanently.

Example embodiments and methods thus being described, it will be appreciated by one skilled in the art that example embodiments may be varied and substituted through routine experimentation while still falling within the scope of the following claims. For example, although debris filter with wave-form plates are shown, step-wise, corrugated, or gridded plates can be used simply through proper forming of example embodiments—and fall within the scope of the claims. Such variations are not to be regarded as departure from the scope of these claims.

What is claimed is:

1. A debris filter useable in a nuclear reactor, the filter comprising:
   a lower section including,
      a first plate having a plurality of peaks and valleys alternating in a transverse direction, and
      a second plate having a plurality of peaks and valleys alternating in the transverse direction, wherein,
         the peaks of the first plate touch the valleys of the second plate so as to form a plurality of channels between the first and the second plates, and
         at least one of the first plate and the second plate includes cut-out features that permit fluid coolant flow between the channels and entrap debris, wherein the cut-out features include diamond-shaped windows with two acute interior angles and sized to match debris flowing through the channels, wherein the cut-out features further include a plurality of triangle notches each cut out from a lowest terminal edge of the channels, and wherein all of the cut-out features are less than 1 centimeter in a longest dimension and on a lower half of the first plate and the second plate, and wherein the first plate and the second plate are otherwise continuous; and an upper section joined to the lower section by a plurality of ligaments extending vertically between the upper section and the lower section in a gap section, and wherein each of the plurality of ligaments includes a profile twist to impart swirl to a fluid flowing through the debris filter, wherein the plurality of ligaments do not overlap transversely with any opening of the channels except for corners of the ligaments in the profile twist extending transversely with the openings of the channels.

2. The debris filter of claim 1, wherein the diamond-shaped windows have a longest centerline aligned with a centerline of the channel.

3. The debris filter of claim 1, wherein each of the notches alternates with each of the windows with either a single notch or a single window between each of the peaks and each of the valleys.

4. The debris filter of claim 1, wherein the cut-out features are formed by stamping the first plate and the second plate to remove material without any extension into the channels.

5. The debris filter of claim 1, wherein none of the cut-out features are on any of the peaks or valleys, and wherein the peaks and valleys are all solid and continuous between vertical ends of the filter.

6. The debris filter of claim 1, wherein the plurality of channels are transversely closed at vertical positions above the cut-out features such that fluid coolant cannot flow between the channels past the cut-out features.

7. A debris filter useable in a nuclear reactor, the filter comprising:

a lower section including,
  a first plate having a plurality of peaks and valleys alternating in a transverse direction, and
  a second plate having a plurality of peaks and valleys alternating in the transverse direction, wherein,
    the peaks of the first plate touch the valleys of the second plate so as to form a plurality of channels between the first and the second plates,
    at least one of the first plate and the second plate includes cut-out features that permit fluid coolant flow between the channels and entrap debris; and
an upper section joined to the lower section by a plurality of ligaments extending vertically between the upper section and the lower section in a gap section, wherein the ligaments include a profile twist to impart swirl to a fluid flowing through the debris filter, wherein the upper section includes,
  a third plate having a plurality of peaks and valleys alternating in a transverse direction, and
  a fourth plate having a plurality of peaks and valleys alternating in the transverse direction, wherein the peaks of the third plate touch the valleys of the fourth plate so as to form a plurality of channels between the third and the fourth plates.

8. The debris filter of claim 7, wherein the plurality of ligaments are stamped from at least one of the plates of the upper section and the lower section.

9. The debris filter of claim 7, wherein the plurality of ligaments do not overlap transversely with any opening of the channels except for corners of the ligaments in the profile twist extending transversely with the openings of the channels.

* * * * *